US010372622B2

(12) United States Patent
Chandran

(10) Patent No.: US 10,372,622 B2
(45) Date of Patent: Aug. 6, 2019

(54) SOFTWARE CONTROLLED CACHE LINE REPLACEMENT WITHIN A DATA PROPERTY DEPENDENT CACHE SEGMENT OF A CACHE USING A CACHE SEGMENTATION ENABLEMENT BIT AND CACHE SEGMENT SELECTION BITS

(71) Applicant: International Business Machines Corporation, Armonk, NY (US)

(72) Inventor: Shajith Chandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 15/417,302

(22) Filed: Jan. 27, 2017

(65) Prior Publication Data
US 2018/0217938 A1     Aug. 2, 2018

(51) Int. Cl.
| | |
|---|---|
| *G06F 12/00* | (2006.01) |
| *G06F 12/109* | (2016.01) |
| *G06F 12/0893* | (2016.01) |
| *G06F 12/1009* | (2016.01) |
| *G06F 12/12* | (2016.01) |
| *G06F 12/127* | (2016.01) |
| *G06F 12/0846* | (2016.01) |

(52) U.S. Cl.
CPC ........ *G06F 12/109* (2013.01); *G06F 12/0893* (2013.01); *G06F 12/1009* (2013.01); *G06F 12/12* (2013.01); *G06F 12/127* (2013.01); *G06F 12/0848* (2013.01); *G06F 2212/1056* (2013.01); *G06F 2212/657* (2013.01)

(58) Field of Classification Search
CPC ............... G06F 12/109; G06F 12/1009; G06F 12/0893; G06F 12/12; G06F 2212/69; G06F 2212/657; G06F 12/127; G06F 12/0848; G06F 2212/1056
USPC ......... 711/129, 128, 122, 144, 145; 713/320
See application file for complete search history.

(56) References Cited

U.S. PATENT DOCUMENTS

| | | | | |
|---|---|---|---|---|
| 5,652,872 | A | * | 7/1997 | Richter ............... G06F 11/3648 703/26 |
| 9,075,730 | B2 | | 7/2015 | Thottethodi et al. |
| 9,081,690 | B2 | | 7/2015 | Araki et al. |
| 9,112,537 | B2 | | 8/2015 | Ramirez et al. |

(Continued)

*Primary Examiner* — Hong C Kim
(74) *Attorney, Agent, or Firm* — Francis Lammes; Stephen J. Walder, Jr.; David M. Quinn

(57) ABSTRACT

Mechanisms are provided, in a data processing system having a processor and a cache subsystem, for providing software controlled cache segmentation and cache segment utilization. The mechanisms segment a cache memory of the cache subsystem such that the cache memory comprises a plurality of cache segments. Each cache segment in the plurality of cache segments is associated with a different data property of data stored in the cache segment. The mechanisms configure software executing on the data processing system to direct cache accesses to one of the cache segments based on a corresponding data property of the cache accesses by the software. The mechanisms process, by the processor, a data access operation from software executing on the processor, based on an identifier of a cache segment in one of an effective address provided by the software or a page table entry corresponding to the effective address provided by the software.

20 Claims, 5 Drawing Sheets

(56) References Cited

U.S. PATENT DOCUMENTS

2006/0136667 A1* 6/2006 Shultz .................. G06F 9/5077
711/118
2008/0034162 A1    2/2008 Sturges et al.
2013/0003845 A1* 1/2013 Zhou ................... H04N 19/197
375/240.16
2013/0031309 A1* 1/2013 David ................. G06F 12/0842
711/127

* cited by examiner

SOFTWARE CONTROLLED CACHE LINE REPLACEMENT WITHIN A DATA PROPERTY DEPENDENT CACHE SEGMENT OF A CACHE USING A CACHE SEGMENTATION ENABLEMENT BIT AND CACHE SEGMENT SELECTION BITS

BACKGROUND

The present application relates generally to an improved data processing apparatus and method and more specifically to mechanisms for software controlled cache line replacement within a cache segment.

Cache memories are well known storage devices that help reduce the costs, in both time and energy, to access data from a main memory. The cache memory is a smaller, faster memory which stores copies of the data from frequently used main memory locations. Most processors have different independent caches, including an instruction cache and data cache, where the data cache is usually organized as a hierarchy of a plurality of cache levels, e.g., level 1 (L1) and level 2 (L2) caches. In processor architectures that utilize virtualized address spaces, a third type of cache memory, referred to as a translation lookaside buffer (TLB), may also be used to speed up virtual-to-physical address translation for both executable instructions and data. The TLB may be part of a memory management unit (MMU) associated with the processor and may operate in conjunction with a page table data structure that is used to store the mapping between virtual addresses and physical addresses, where virtual addresses are used by the accessing process and physical addresses are used by the hardware.

When a processor needs to read from or write to a location in main memory, the processor first performs a cache check operation to check whether a copy of that data is in the cache memory. If so, the processor immediately reads from or writes to the cache memory which tends to be much faster than reading from or writing to main memory.

Data is transferred between main memory and cache in blocks of fixed size called cache lines or cache blocks. When a cache line is copied from main memory into the cache, a cache entry is created that includes the copied data as well as the requested memory location, which is often times referred to as a tag. When the cache memory is checked, the cache is first checked for a corresponding entry, determined based on the tag, and then looks for the contents of the requested memory location in any cache lines that may contain that address. If the processor finds the memory location is in the cache, a cache hit has occurred and the data may be accessed from the cache line. If the processor does not find the memory location in the cache, then a cache miss has occurred and a new cache entry is created and data from the main memory corresponding to the memory location is copied into the cache.

Cache memories are generally provided in two varieties, i.e. direct mapped cache and associative cache, which are based on the replacement policy implemented by the cache memory. With direct mapped caches, data from a main memory can be placed in only one place in the cache, i.e. each location in main memory can be cached by just one cache entry. With associative caches, the replacement policy implement is free to choose any entry in the cache to hold the copy of the data. In some caches, a compromise between direct mapped and associative caches is implemented in which each location in the main memory can go to any one of N places in the cache. These compromise cache structures are referred to as N-way set associative caches.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system having a processor and a cache subsystem is provided. The method comprise segmenting a cache memory of the cache subsystem such that the cache memory comprises a plurality of cache segments. Each cache segment in the plurality of cache segments is associated with a different data property of data stored in the cache segment. The method further comprises configuring software executing on the data processing system to direct cache accesses to one of the cache segments based on a corresponding data property of the cache accesses by the software. Moreover, the method comprises processing, by a processor of the data processing system, a data access operation from software executing on the processor, based on an identifier of a cache segment in one of an effective address provided by the software or a page table entry corresponding to the effective address provided by the software.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
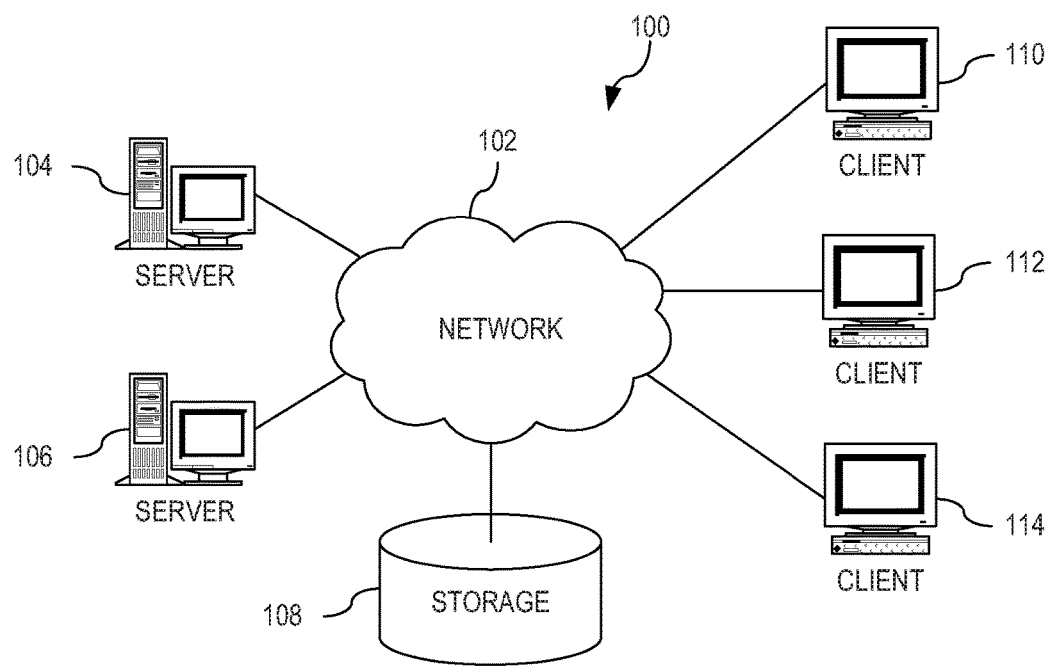
FIG. 1 is an example diagram of a distributed data processing system in which aspects of the illustrative embodiments may be implemented.

The illustrative embodiments provide mechanisms for software controlled cache line replacement within a cache segment. The illustrative embodiments recognize that applications may have different data regions with different usage properties, e.g., some data may be used relatively more frequently than other data within the cache. As a result, applications may benefit when data is cached based on one or more properties of the data, such that data that is used by the application in a particular manner different from other data may be cached in different ways within the cache itself. While some mechanisms may utilize cache hinting instructions, such as dcbt and stride hints, to tell the cache subsystem that an access to data should be treated differently, e.g., increase or decrease pre-fetch or set replacement policy, such hinting instructions must be provided prior to any access so that the hint can be propagated to the cache for a particular data access. To the contrary, as one benefit of the illustrative embodiments as set forth hereafter, a significant improvement in cache hinting operations is provided by providing the cache hint capability through the effective address bits themselves, or in the general memory management unit (MMU).

The illustrative embodiments provide a cache architecture in which the cache is able to be divided into two or more segments. These cache segments, or regions of the cache, may be created in two different fashions. In one illustrative embodiment, the entire cache may be divided into two or more segments or regions. In another illustrative embodiment, the cache lines that form a cache set, e.g., a N-way cache set, may be divided into two or more segments, such that each cache set comprising N cache lines may have a two or more segments with each segment having a subset of the cache lines from the cache set, e.g., in an N-way cache set that is divided into two segments, a first segment may have cache lines 1 to N/2 of the N cache lines, and the second segment will have the remainder of the cache lines in the N-way cache set. In still further illustrative embodiments, a combination of segmentation of the entire cache and segmentation within N-way cache sets may be utilized.

The number of segments provided in the cache or cache set is implementation dependent and can have any number of segments equal to or greater than two. However, for ease of explanation, the following description will assume that the cache is divided into two segments, although it should be appreciated that illustrative embodiments may be extended to more than two segments. Moreover, for ease of explanation, it will be assumed that the cache segments are generated with regard to the entire cache rather than for cache sets. However, in view of the present description, it will be readily apparent to those of ordinary skill in the art how the mechanisms of the illustrative embodiments may be applied to segmentation of cache sets as mentioned above.

Mechanisms are provided to allow the application, operating system, hypervisor, or the like, to control what type of data is mapped into these segments such that the application, operating system, virtual machine monitor (VMM), such as a hypervisor, or the like (hereafter collectively referred to as software) is able to cache data with similar properties into the same segments without requiring additional hardware or logical structures. That is, the bits in existing hardware page table entries of a page table data structure, or effective address data structures, can be used for performing the software controlled caching based on cache segments and similar data properties.

Thus, in one aspect of the illustrative embodiments, mechanisms provide software controlled cache line placement into different cache segments (or regions). The software controls the placement of cache lines of a page through the bits in the existing hardware page table (HPT). No new hardware tables, logical structures, or instructions are needed to perform such controls. The bit(s) in the HPT entry are passed to the cache subsystem along with the real address, which is then used to select a cache segment in the cache in which to place the cache line. That is, a selector bit, or bits in the case of more than two cache segments, in the HPT entry may be used to identify in which segment of the cache, the cache line is to be placed, or from which segment the cache line may be accessed.

Using the hardware page table (HPT) page table entry (PTE) bits to provide a hint as to the cache segment to be used for caching the cache lines from the page frame, the cache set, or the entire cache if desired, is segmented into two or more segments (two segments for purposes of the examples set forth herein), and the hint identifies which of these cache segments the PTE's corresponding cache line is stored in within the segmented cache. That is, the PTE may include a cache segment selection enable/disable bit and one or more cache segment selection bit(s). If segment selection is enabled for the page frame, then the cache lines from that page frame will be placed into the cache segment indicated by the cache segment selection bit. Otherwise, if the segment selection is not enabled for the page frame, then the cache lines may be placed anywhere within the cache set, or cache.

The bits in the PTE are controlled by the software through operating system calls or directly by the operating system (OS) or virtual machine manager, e.g., Hypervisor. Thus, in some illustrative embodiments, the application level software, can control the mapping of its own data utilized by that application, to a particular cache segment or set of cache segments at a page level through the PTE cache segment enable/disable bit and the cache segment selection bit(s). In some illustrative embodiments, the OS may control the mapping of data to cache segments at the process level. For example, using the mechanisms of the illustrative embodiments, the OS can restrict a process, such as a low priority process, to a cache segment by setting the cache segment enable/disable bit and cache segment selection bit(s) in the PTEs of all the page frames used by that process to point to the same cache segment. Moreover, in still other illustrative embodiments, the VMM can restrict a logical partition (LPAR) or virtual machine to a particular cache segment or set of cache segments, such as to address the noisy neighbor issue, e.g., one entity monopolizing a resource, in split core mode or shared processor logical partition (SPLPAR).

The memory management unit (MMU) passes the cache segment selection bit(s) to the cache controller along with the physical address. Also, since the processors are capable of parallel lookup within a cache set for the physical address tag, the cache segment selection bits need not be used during cache lookup. What this means is that when placing a new cache line into the cache set, the cache segment selection bits may be used to select the cache segment where the cache line is to be placed, however, if the processor is performing a lookup operation for a cache line, such as due to a snoop request, for example, the processor can search the entire cache set without any overhead since parallel lookup within a cache set is a common design. This can greatly simplify software design to exploit this feature. Also, the cache controller does not have to remember the cache segment selection bit for a cached physical address. Moreover, the caching property of the page may be dynamically changed as needed based on the life cycle of the data contained in the page frame, i.e. the storage unit in which the contents of the page are stored.

In a second aspect of the illustrative embodiments, the software is able to divide the address space into address regions and map each of the address regions to a particular segment in the cache. The address regions are created using the most significant bit (MSB) bits of the effective address, or virtual address. These bits are passed to the cache subsystem which then uses these bits for selecting the cache segment for the placement of the cache line. Thus, the software is able to divide the address space to place data with different types of data properties into different cache segments according to the desired implementation. For example, the cache may be segmented into a long term data cache segment and a short term data cache segment and the cache segment selection bit(s) may be used to direct data to the appropriate cache segment based on the data longevity property. The MMU may pass the cache segment selection bits of the effective address (EA), also referred to as a virtual address, along with the physical address (also referred to as a real address), to the cache controller for lookup and for placing the cache line into the appropriate cache segment.

Hence, the mechanisms of the illustrative embodiments provide additional functionality in the software associated with the management and utilization of the cache memory so as to allow for segmentation of the cache memory into two or more cache segments. Moreover, the mechanisms of the illustrative embodiments provide functionality for utilizing bits in the page table entry or effective address to indicate whether or not cache segmentation is enabled/disabled and which cache segment is selected for the particular data based on data properties. The actual setting of the cache segment selection bit(s) in the page table entry or effective address may be performed by the particular software involved, e.g., the application, operating system, virtual machine monitor, or the like.

Before beginning the discussion of the various aspects of the illustrative embodiments in further detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the illustrative embodiments provide additional or new functionality that improves the operation of a computing device with regard to the way in which data is stored in a cache memory of the computing device. The illustrative embodiments provide functionality and mechanisms within the computing device to segment a cache memory into a plurality of cache segments which may be associated with data having different data properties, such as data longevity or the like. The illustrative embodiments further provide functionality and mechanisms for setting bits in a page table entry or effective address to control the placement of data into cache segments according to data properties and a desired implementation. The specific settings of the bits may be controlled by software executing in the computing device and these settings may be identified when accessing the segmented cache.

Figure 2:
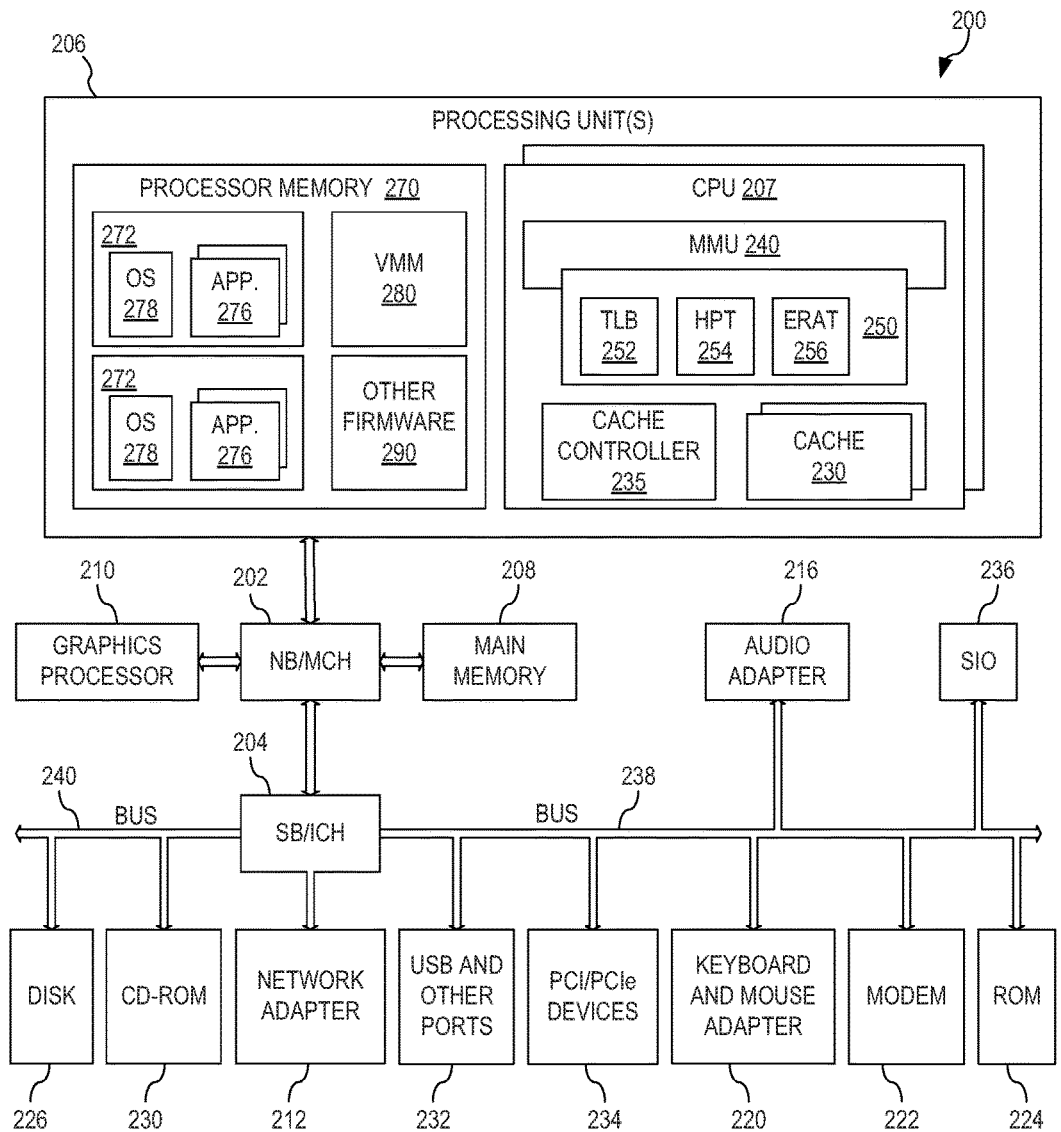
FIG. 2 is an example block diagram of a computing device in which aspects of the illustrative embodiments may be implemented.

As the disclosed illustrative embodiments are clearly directed to improvements in computing technology and specifically directed to improving the way in which data is stored in a cache memory as well as the accessing of such data via the cache memory, the illustrative embodiments may be utilized in any computing device, or even computing environment, in which cache memories are utilized. Thus, the illustrative embodiments may be implemented in many different types of data processing environments and in many different computing devices of these different types of data processing environments, such as in server computing devices, client computing devices, mobile computing devices, storage systems, and the like. In order to provide a context for the description of the specific elements and functionality of the illustrative embodiments, FIGS. 1-2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104 and/or client 110, may be specifically configured to implement a software controlled segmented cache subsystem in accordance with the illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates more efficient storage and accessing of data within a cache memory by segmenting the cache memory and associating data with different cache segments based on data properties of the data.

As noted above, the mechanisms of the illustrative embodiments utilize specifically configured computing devices, or data processing systems, to perform the operations for segmenting a cache memory into a plurality of cache segments, placing data into the cache segments in accordance with data properties and a desired data placement policy or scheme, and accessing the segmented cache memory to access the cached data in the various segments in accordance with the cache segment selection bits in a page table entry or effective address. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE)

or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for execution by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the software controlled segmented cache.

The processing unit 206 may take many different forms depending on the particular implementation. For instance, the processing unit 206 and computing device 200 may provide a computing environment based on the PowerPC architecture, also referred to as Power ISA, offered by International Business Machines Corporation (IBM) and described in Power ISA™, Version 2.07, May 3, 2013, hereby incorporated by reference herein in its entirety, may include one or more aspects, as well as computing environments of other architectures, such as the z/Architecture, offered by International Business Machines Corporation, and described in z/Architecture—Principles of Operation, Publication No. SA22-7932-09, 10th Edition, September 2012, which is also hereby incorporated by reference herein in its entirety.

In each implementation, however, the processing unit 206 includes one or more processing cores or CPUs 207, where each processing core or CPU 207 may be associated with one or more cache memories 230 which may be segmented and utilized in the manner described herein, by the mechanisms described herein, to achieve an improvement in data caching and access. A cache controller 235 moderates data transfer into and out of the one or more cache memories 230, where the cache controller 235 and cache memories 230 may also collectively be referred to herein as the cache subsystem. Furthermore, the processing cores or CPUs 207 include at least one memory management unit (MMU) 240 and one or more address translation structures 250. The one or more address translation structures 250 may include, for example, a translation lookaside buffer (TLB) 252, a hardware page table data structure 254, effective to real address translation (ERAT) data structure 256, and the like.

MMU 240 is used in managing main memory 208 including facilitating access to the memory by providing address translation. To improve address translation, the memory management unit utilizes one or more address translation structures 250 including, for instance, the translation lookaside buffer (TLB) 252 and page table data structure 254, which, in one embodiment, are located in the MMU 240. In a further embodiment, address translation structures 256 also include an effective to real address translation (ERAT) structure 256, which, in one illustrative embodiment, is located in the processor outside the MMU 240 and which operates to translate effective, or virtual, addresses to real, or physical, addresses.

The processing unit 206 may further comprise a processor memory 270 includes one or more virtual machines or logical partitions 272 (for example, virtual machines are used in the PowerPC architecture while logical partitions are used in the z/Architecture), and processor firmware 274, which includes a virtual machine monitor (VMM) 280, e.g., a hypervisor, and other processor firmware 290. As used herein, firmware includes, e.g., the microcode and/or millicode of the processor. Firmware includes, for instance, the hardware-level instructions and/or data structures used in implementation of higher level machine code. In one embodiment, firmware includes, for instance, proprietary code that is typically delivered as microcode that includes trusted software or microcode specific to the underlying hardware and controls operating system access to the system hardware.

Each virtual machine or logical partition 272 functions as a separate system and has one or more applications 276, and optionally, a resident operating system 278 therein, which may differ for each virtual machine or logical partition 272. In one embodiment, the operating system 278 is the z/VM operating system, the z/OS operating system, the z/Linux operating system, the TPF operating system, the AIX operating system, the Power Linux operating system, the IBM i/OS operating system, or another operating system offered by International Business Machines Corporation, of Armonk, N.Y., or another source. The virtual machines or logical partitions 272 are managed by the virtual machine monitor (VMM) 280, which in the depicted example is a hypervisor 280.

Cores or CPUs 207 are physical processor resources assignable to the virtual machines or allocated to the logical partitions 272. For instance, each virtual machine or logical partition 272 includes one or more logical processors, each of which represents all or a share of a physical processor 207 that may be dynamically allocated to the virtual machine or logical partition 272.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As mentioned above, the illustrative embodiments provide a cache architecture in which the cache 230 is able to be divided into two or more segments. The cache segments are essentially portions of the cache line space that are associated with one another and to which data having one or more same data properties may be mapped via cache segment selection bits. The cache controller 235 and/or MMU 240 may segment the cache 230 in accordance with an established cache segmentation policy such that a plurality of cache segments are generated. These cache segments may be of the same or different sizes, i.e. may have the same number or different number of cache lines associated with those cache segments. For purposes of illustration, it will be assumed that the cache 230 is segmented according to a cache segmentation policy that generates two cache segments of approximately equal size. It will be apparent to those of ordinary skill in the art, in view of the present description, that the illustrative embodiments may be readily extended to more than two cache segments.

Mechanisms are provided to allow the applications 276, operating system 278, VMM (e.g., hypervisor) 280, or the like, to control what type of data is mapped into these segments such that the applications 276, operating system 278, VMM 280, or the like is able to cache data with similar data properties into the same segments without requiring additional hardware or logical structures. In one illustrative embodiment, the bits in existing hardware page table entries of a hardware page table data structure 254, or effective address data structures, such as may be used with the ERAT 256, can be used for performing the software controlled caching based on cache segments and similar data properties. The software controls the placement of cache lines of a page through the bits in the existing hardware page table (HPT) 254. No new hardware tables, logical structures, or instructions are needed to perform such controls. The bit(s) in the HPT 254 entry are passed to the cache subsystem, e.g., cache controller 235 and cache 230, along with the real address, which is then used to select a cache segment in the cache 230 in which to place the cache line. That is, a selector bit, or bits in the case of more than two cache segments, in the HPT 254 entry may be used to identify in which segment of the cache 230, the cache line is to be placed, or from which segment the cache line may be accessed.

Figure 3:
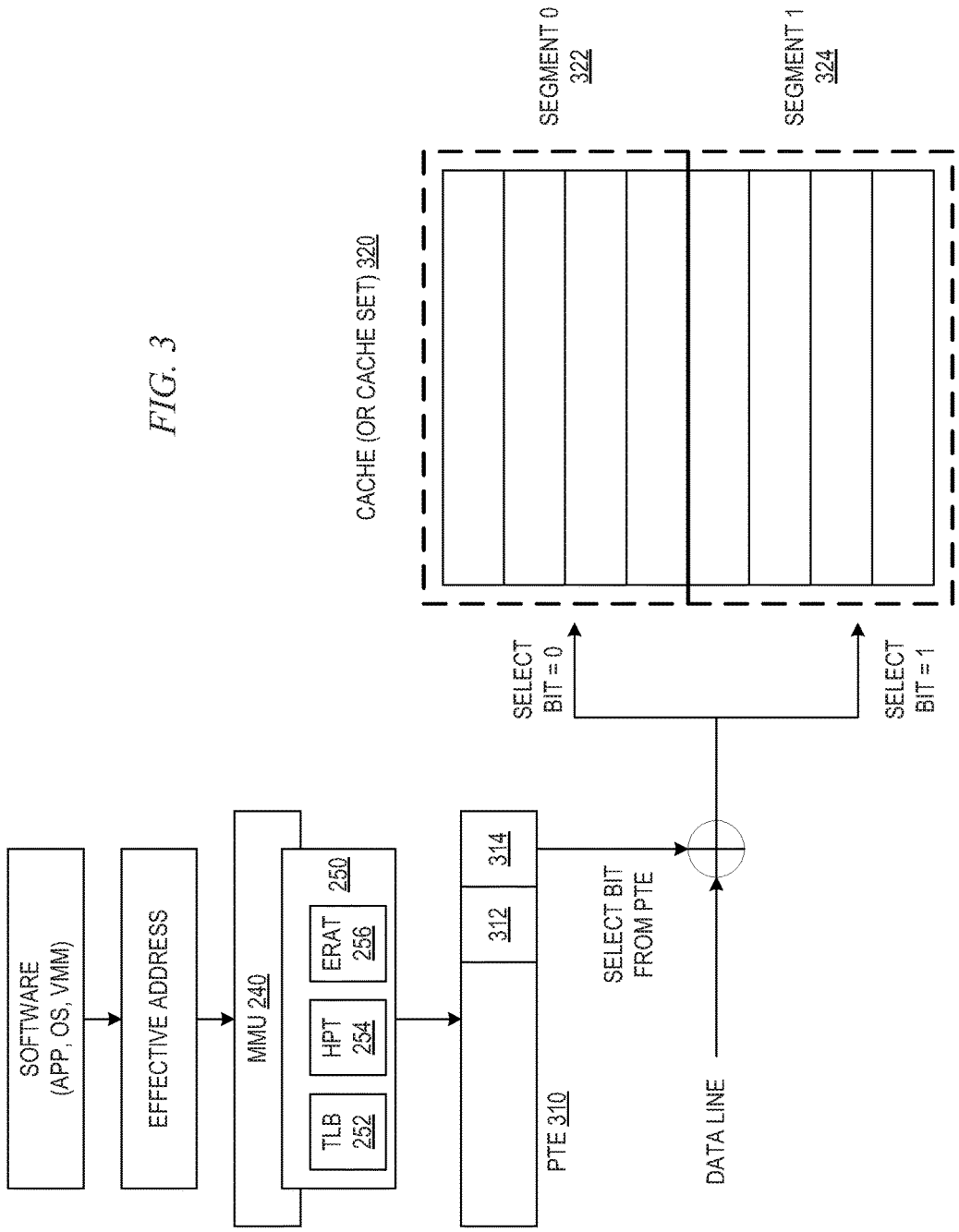
FIG. 3 is an example diagram of one illustrative embodiment operation in which a page table entry (PTE) of the hardware page table (HPT) is utilized to provide the cache segment selection bit(s)

FIG. 3 is an example diagram of one illustrative embodiment operation in which a page table entry (PTE) of the hardware page table (HPT) 254 is utilized to provide the cache segment selection bit(s). As is generally known in the art, an effective address (EA), or virtual address, may be provided to the translation structures 250 for translation to a real, or physical, address for accessing the data corresponding to the EA. For example, the EA/virtual address may be provided to the translation lookaside buffer (TLB) 252, which is an associative cache that stores recently used mappings from the hardware page table (HPT) 254. If there is a miss in the TLB 252, then the EA/virtual address is provided to the HPT 254 to look for a mapping of the effective address to a physical address which is then written back to the TLB 252 and the instruction is restarted.

In addition, in accordance with the illustrative embodiments, as shown in FIG. 3, the page table entry (PTE) 310 in the hardware page table 254 includes a cache segment enablement bit 312 and one or more cache segment selection bits 314. In response to the cache segment enablement bit 312 being set to indicate cache segmenting is used with a corresponding page frame of the PTE 310, the one or more cache segment selection bits 314 are used to provide a hint as to the cache segment to be used for caching the cache lines from the page frame corresponding to the PTE 310. If the cache segment enablement bit 312 is not set, then the cache line of the page frame associated with the PTE 310 may be stored anywhere in the cache or cache set 320 and thus, a known or conventional operation for accessing the cache line in the cache or cache set 320 is performed.

As shown, the cache set 320, or the entire cache if desired in the particular implementation, is segmented into two or more segments (two segments for purposes of the examples set forth herein) 322 and 324, and the one or more cache selection bits 314, which in the depicted example is a single bit set to 0 or 1, identifies which of these cache segments 322 or 324 the PTE's corresponding cache line is stored in within the segmented cache 320. In the depicted example, a cache segment selection bit 314 having a setting of 0 points to a first cache segment 322 while a cache segment selection bit 314 having a setting of 1 points to the second cache segment 324.

The particular setting of the cache segment enablement bit 312 and one or more cache segment selection bits 314 in the PTE 310 is controlled by the software. In some illustrative embodiments, the control of the setting of these bits 312, 314 is performed via operating system calls from the software or direct control by the operating system itself. For example, with regard to application software control, such as by way of applications 276 in FIG. 2, the control of the setting of these bits may be performed via operating system calls by the application 276 to the operating system 278. Similarly, a virtual machine manager, e.g., hypervisor, such as VMM 280 may also control the setting of these bits 312, 314 via an operating system call to operating system 278 or may set the bits 312, 314 via a second illustrative embodiment in which the bits 314 are provided in an effective address as discussed hereafter. Moreover, the operating system 278 may directly control the setting of these bits in the PTE 310 or effective address as discussed hereafter.

Thus, in some illustrative embodiments, the application level software 276, can control the mapping of its own data utilized by that application 276, to a particular cache segment 322, 324 or set of cache segments at a page level through the PTE cache segment enable/disable bit 312 and the cache segment selection bit(s) 314. In some illustrative embodiments, the OS 278 may control the mapping of data to cache segments 322, 324 at the process level. For example, using the mechanisms of the illustrative embodiments, the OS 278 can restrict a process of an application 276, such as a low priority process, to a cache segment 322, 324 by setting the cache segment enable/disable bit 312 and cache segment selection bit(s) 314 in the PTEs 310 of all the page frames used by that process to point to the same cache segment, e.g., cache segment 324. Moreover, in still other illustrative embodiments, the VMM 280 can restrict a logical partition (LPAR) or virtual machine 272 to a particular cache segment 322, 324 or set of cache segments, such as to address the noisy neighbor issue in split core mode or shared processor logical partition (SPLPAR), as previously mentioned above.

The memory management unit (MMU) 240 passes the cache segment selection bit(s) 314 to the cache controller 235 along with the physical address. The hardware of the cache controller 235, as shown in FIG. 3, in response to the cache segment enablement bit 312 being set to enable cache segmentation utilization for the page frame, receives the cache segment selection bit 314 from the PTE 310 and uses the cache segment selection bit to identify the corresponding cache segment 322, 324 based on the currently implemented cache segmentation policy, which in this case is to segment the cache set or cache 320 into two equally sized cache segments 322, 324 having a same number of cache lines. Having identified the cache segment 322, 324 associated with the cache line in which the page of the page frame associated with the PTE 310 is present, the data may be accessed, e.g., data written to or read from the cache line in the cache segment 322, 324 via the data line.

It should be appreciated that since the cache segmentation and identification of cache segments in which data is stored in the cache 320 is controlled by the software, the software may determine data properties that are the basis upon which different cache segments are utilized. For example, the application, OS, or VMM may determine that data associated with processes having a relatively low priority may be stored in one cache segment 324 while data associated with processes having a relatively higher priority may be stored in a second cache segment 322. Moreover, in some cases, data having a relatively short longevity may be directed to the first cache segment 324 while data having a relatively longer longevity may be associated with the second cache segment 322. Any desirable data property may be used by the software, e.g., application, OS, VMM, etc., to make determinations as to how to set the cache segment selection bit(s) 314 in the PTE 310 to direct the data access to a particular cache segment 322, 324 without departing from the spirit and scope of the present invention.

Moreover, the setting of the cache segment selection bit(s) 314, and even whether or not to use cache segmentation with a particular page frame via the cache segmentation enablement bit 312, may be dynamically updated as data properties change over time. Thus, for example, if a process' priority changes over time, such as with regard to workload balancing or scheduling of processes, the change in priority may be automatically reflected in the software's setting of the cache segment selection bit(s) 314 so as to redirect access of the data to an appropriate cache segment 322, 324 corresponding to the new priority data property. Similarly, if the longevity of data changes over time, the cache segment selection bit(s) 314 may be dynamically updated to direct the data accesses to an appropriate cache segment 322, 324 corresponding to the new longevity data property.

As noted above, the use of bits in the PTE 310 is one embodiment for facilitating the cache segmentation and utilization of the cache segments for data having different data properties. In other illustrative embodiments, the software (e.g., applications 276, OS 278, VMM 280, or the like) is able to divide the address space into address regions and map each of the address regions to a particular cache segment 322, 324 in the segmented cache set or cache 320.

Figure 4:
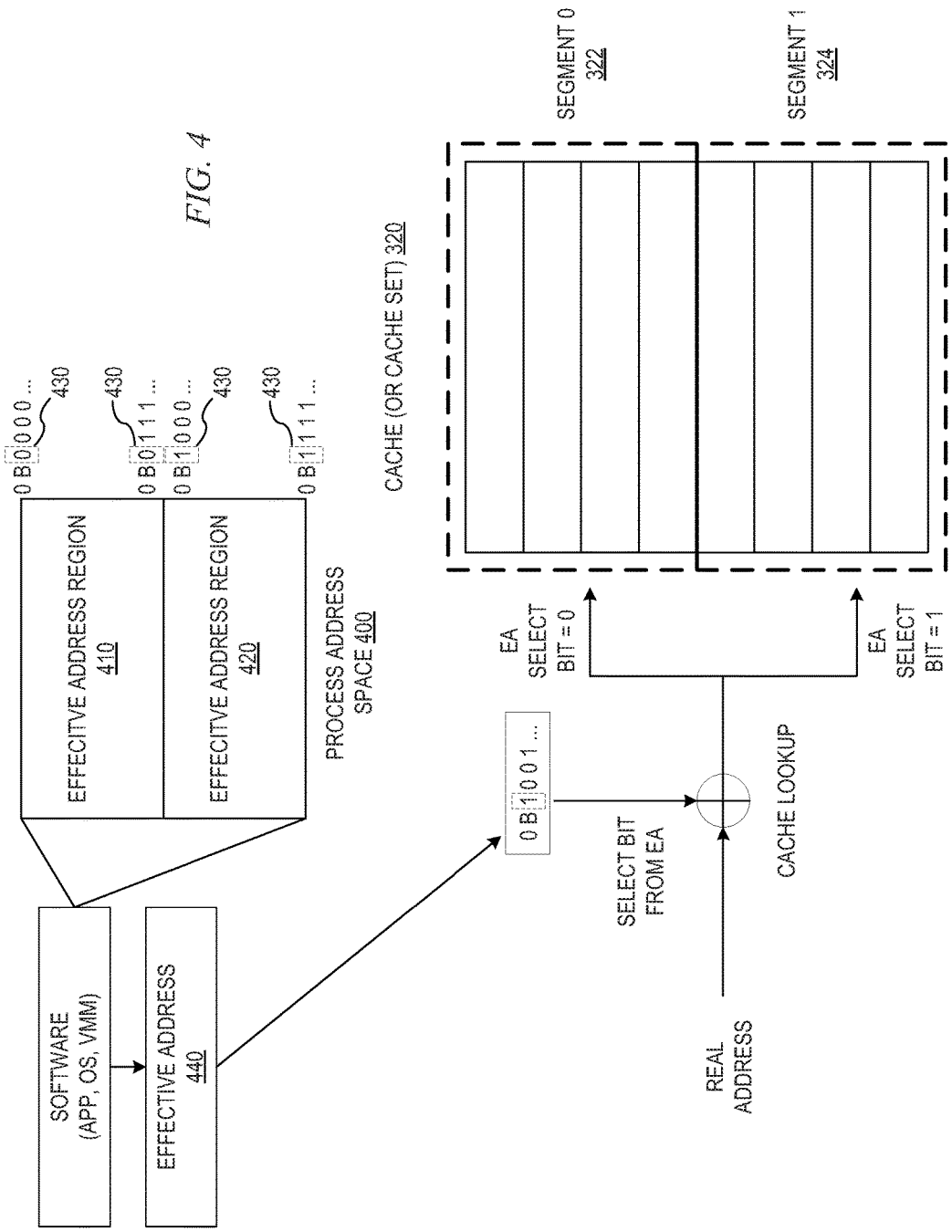
FIG. 4 illustrates one example implementation for utilizing address regions to facilitate cache segmentation.

FIG. 4 illustrates one example implementation for utilizing address regions to facilitate cache segmentation. As shown in FIG. 4, the address regions 410 and 420 of the address space 400 are created using the most significant bit (MSB) bit(s) of the effective address, or virtual address. These MSB bits, which serve as cache segment selection bit(s) 430 in the illustrative embodiments, are passed by the MMU 240 in FIG. 2, to the cache subsystem, e.g., cache controller 235 and cache 230 in FIG. 2, which then uses these bits as the cache segment selection bit(s) 430, in a similar way as the cache segment selection bit(s) 314 in the PTE 310, for selecting the cache segment 322, 324 for the placement of the cache line. Thus, the cache segment selection bit(s) 430 of the effective address 440 are used to select the cache segment 322, 324 in which to place the cache line associated with the data or to search for the cache line holding the data of a data access operation.

Similar to the previously described PTE 310 based embodiments, the mapping by the software of data to particular cache segments 322, 324 may be performed based on various data properties, such as longevity of the data, process priority, or the like. Thus, the software is able to divide the address space 400 to place data with different types of data properties into different cache segments 322, 324 according to the desired implementation. For example, the cache 320 may be segmented into a long term data cache segment 322 and a short term data cache segment 324 and the cache segment selection bit(s) 430 of the effective address 440 may be used to direct data to the appropriate cache segment 322, 324 based on the data longevity property. The MMU 240 may pass the cache segment selection bits 430 of the effective address (EA) 440, or virtual address, along with the physical address, or real address, to the cache controller 235 for performing a cache lookup and for placing the cache line into the appropriate cache segment 322, 324.

Hence, the mechanisms of the illustrative embodiments provide additional functionality in the software associated with the management and utilization of the cache memory so as to allow for segmentation of the cache memory into two or more cache segments. Moreover, the mechanisms of the illustrative embodiments provide functionality for utilizing bits in the page table entry or effective address to indicate whether or not cache segmentation is enabled/disabled and which cache segment is selected for the particular data based on data properties. The actual setting of the cache segment selection bit(s) in the page table entry or effective address may be performed by the particular software involved, e.g., the application, operating system, virtual machine monitor, or the like.

It should be appreciated from the above description that some modifications to the operating system, e.g., OS 278 and the cache subsystem of the cores or CPUs, such as CPU 207 in FIG. 2, may be implemented to facilitate the operation of the illustrative embodiments. In particular, each individual page frame of the hardware page table data structure 254 is mapped to only one cache segment 322, 324 at any particular time, although the cache segment 322, 324 to which the page frame is mapped may be dynamically changed. That is, the cache line data in the page frame does not span multiple cache segments. This restriction may be implemented at the operating system 278, application 276, or VMM 280 level based on changes to the corresponding software to implement the cache segmentation policy, and may be enforced by the operating system, e.g., OS 278. The enforcement of this policy may be performed by the OS 278 by maintaining the cache segment selection bit(s) for each active page frame and fail all new mapping requests to this page frame which do not satisfy the restriction. Moreover, the OS 278 may maintain the last mapping for a freed page and if that page is remapped to a new address space with different cache segment selection bit(s), then the OS 278 may invalidate the cache for the whole page using the last cache segment selection bit(s). Moreover, cross memory attaches are also required to satisfy the single cache segment restriction mentioned above.

With regard to the cache subsystem, changes may be made to the cache subsystem and snooping protocol, e.g., cache controller 235 and cache 230, to implement the following request/response operations so as to maintain the integrity of the cache 230. A cache subsystem receives a request for a cache line lookup for a real or physical address. The request for cached data may come, for example, from a compute unit of the local core 207 or from other cores in the form of snoop packets. Also, a cache subsystem can receive responses with data from other cores or the memory subsystem. All of these events are handled as described hereafter to maintain the integrity of the cache 230.

With regard to requests, in situations where requests from a local core 207 are received in a cache segmentation on mode, i.e. data is stored in the cache in specified cache segments, as may be indicated by the cache segmentation enable/disable bit 312 for example, the local core 207 will pass the cache segment selection bit(s), e.g., bits 314, to the cache subsystem which uses the cache segment selection bit to select the cache segment, e.g., segment 322 or 324, to search for the corresponding cache line. If the data is not found in the cache 230, a snoop packet is sent by the cache subsystem which includes the cache segment selection bit(s). In a situation where a request is received from a local core 207 in a cache segmentation off mode, as may be indicated by the cache segmentation enable/disable bit 312, the local core 207 will indicate that the cache segment selection bit(s) are not available and, as a result, the local cache subsystem should search all of the cache segments for the real or physical address. If the data is not found in the cache 230, a snoop packet is sent by the cache subsystem which includes an indicator that the cache segment selection bit(s) are not available.

If a request is received in the form of a snoop packet from a remote core, then if the cache segment selection bit(s) are available, a search of the corresponding cache segment is performed by the cache subsystem, for the real address or physical address and a response is sent with the data. If the cache segment selection bit(s) are not available in the snoop request, e.g., the source core is running in a cache segmentation off mode, then a search of all of the cache segments by the cache subsystem is performed for the data. If found, a response back to the source core is sent so that the data may be cached. In the case where cache segment selection bit(s) are available, the response may include these bits so that the data may be cached in the correct cache segment at the local cache of the source core.

Thus, with the responses, when another remote core responds with data, the cache segment selection bit(s) should be available such that the appropriate cache segment is used to store the data in the cache if possible, such as in the case where cache segmentation is on. In the case where cache segmentation is turned off, then the data may be treated as not cacheable and passed directly to the local core for processing.

With regard to direct memory access (DMA) operations, such as from an input/output adapter or other computing element, TCE entries can be updated with the cache segment selection bit(s) if available during creation. If the TCE table does not have the cache segment selection bit(s) available, DMA access may be performed similar to a real mode access mode of operation, i.e. cache segmentation is turned off. A TCE bypass mode also works similar to the real mode access, i.e. cache segmentation turned off.

The above modifications to the processors can be simplified further when the processors are designed to search different cache segments in parallel. In such a case, the cache segment selection bit(s) may be needed only during the placement of the cache line. After placement of a cache line, the cache segment selection bits are not needed for lookup because the processor will search all cache segments in parallel.

Thus, the illustrative embodiments provide mechanisms for implementing a segmented cache architecture such that data having particular data properties may be directed to appropriate segments of a cache memory based on a cache segmentation policy. Each cache segment may have data having similar data properties to one another, e.g., similar categorization of longevity, similar categorization of process priorities associated with the data, or the like. The mechanisms of the illustrative embodiments allow bits existing in the page table entry (PTE) or effective address to serve as hints or indicators as to where the cache lines for the data are placed in the cache by specifying whether cache segmentation is enabled/disabled and if enabled, the particular cache segment that was selected for placement of the cache line. Mechanisms are provided for handling the accessing of the cache memory based on such cache segmentation as well.

Figure 5:
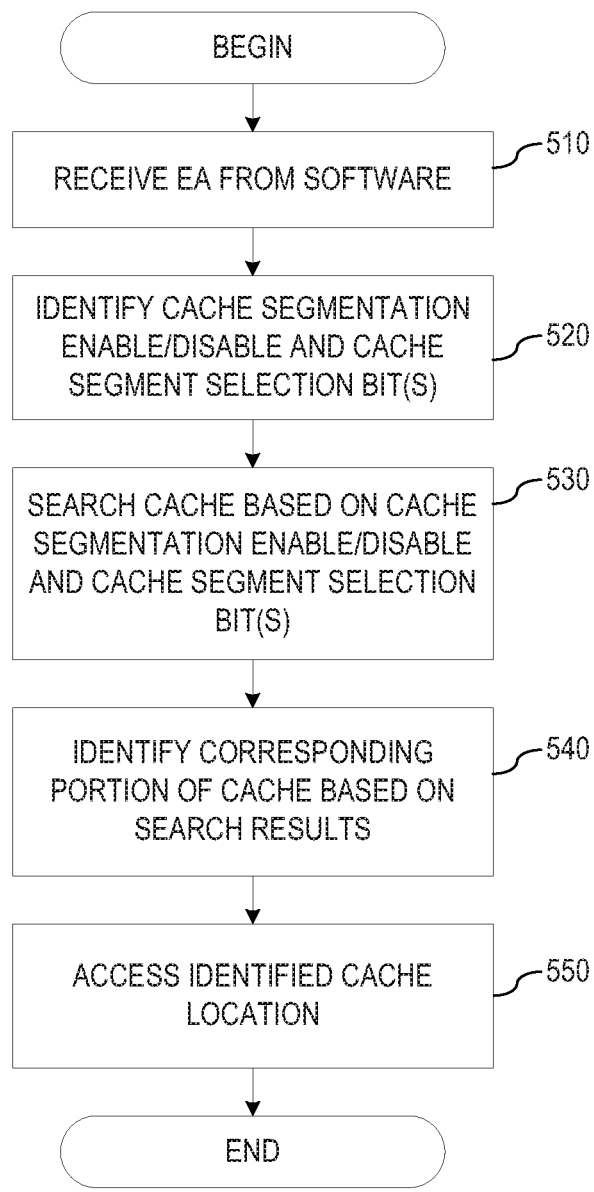
FIG. 5 is a flowchart outlining an example operation for accessing a segmented cache in accordance with one illustrative embodiment.

FIG. 5 is a flowchart outlining an example operation for accessing a segmented cache in accordance with one illustrative embodiment. The operation outlined in FIG. 5 may be implemented, for example, by a combination of the MMU 240, and its corresponding address translation structures 250, in conjunction with cache controller 235 and cache 230 in FIG. 2 (collectively referred to as the cache subsystem).

As shown in FIG. 5, the operation starts by receiving, such as from the application 276, OS 278, or VMM 280, an effective address (step 510). The effective address is processed to identify a cache segmentation enable/disable bit and one or more cache segment selection bit(s) (step 520). In one illustrative embodiment, this identification may be performed by mapping the effective address to a page table entry in the hardware page table data structure, where the page table entry includes the cache segmentation enable/disable bit and the one or more cache segment selection bit(s). In other illustrative embodiments, these bits may be provided directly in the effective address with a mapping of the effective address to a cache segment being present in the MMU 240 or cache controller 235, for example. In either case, the software maps the data based on a data property and a cache segmentation policy, by setting the appropriate bits in the effective address to specify the particular cache segment associated with the data.

Based on the identified cache segmentation enable/disable bit and the one or more cache segment selection bit(s), a search of the cache is performed to identify the location associated with a real address that is associated with the effective address (step 530). The search may be a search of only the specified cache segment in the case where cache segmentation is enabled and the one or more cache segment selection bit(s) identify a cache segment. The search may alternatively be of the entire cache, i.e. all cache segments, in the case where cache segmentation is not enable for the particular effective address. A corresponding portion of the cache is identified based on results of the search (step 540) and the cache location corresponding to the real address associated with the effective address is accessed (step 550). This access may be to either read data from the cache or write data to the cache, as is generally known in the art. The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system having a processor and a cache subsystem, comprising:
   segmenting a cache memory of the cache subsystem such that the cache memory comprises a plurality of cache segments, wherein each cache segment in the plurality of cache segments is associated with a different data property of data stored in the cache segment;
   configuring software executing on the data processing system to direct cache accesses to one of the cache segments based on a corresponding data property of the cache accesses by the software; and
   processing, by the processor, a data access operation from the software executing on the processor, based on an identifier of a cache segment in one of an effective address provided by the software or a page table entry corresponding to the effective address provided by the software, wherein the identifier comprises a cache segmentation enablement bit that indicates cache segmenting is used with a page frame corresponding to the page table entry and one or more cache segment selection bits that each indicate a cache segment to be used for caching the cache lines from the page frame corresponding to the page table entry.

2. The method of claim 1, wherein the software is one of an application, an operating system, or a virtual machine monitor.

3. The method of claim 1, wherein the identifier of the cache segment is in the page table entry in a hardware page table.

4. The method of claim 3, wherein the one or more cache segment selection bits identify a specific cache segment in which data, corresponding to a page frame of a page corresponding to the page table entry, is stored.

5. The method of claim 1, wherein the identifier of the cache segment is a cache segment selection bit of the one or more cache section selection bits in the effective address.

6. The method of claim 5, wherein segmenting the cache comprises mapping a first range of effective addresses to a first cache segment and associating a first cache segment selection bit setting in effective addresses with the first cache segment, and mapping a second range of effective addresses to a second cache segment and associating a second cache segment selection bit setting in effective address with the second cache segment.

7. The method of claim 1, wherein the software executing on the processor controls, via operating system calls, mapping of data utilized by the software to a particular cache segment or set of cache segments at a page level via a page table entry cache segment enable/disable bit and at least one page table entry cache segment selection bit in the page table entry in a hardware page table.

8. The method of claim 1, wherein data property of the data comprises a data longevity property that specifies whether corresponding data is to be placed in a long term data cache segment or a short term data cache segment of the cache, and wherein the identifier of a cache segment identifies one of the long term data cache segment or the short term data cache segment of the cache.

9. The method of claim 1, wherein an operating system executing in the data processing system restricts a relatively low priority process of the software executing on the processor to a particular cache segment or set of cache segments by setting cache segment enable/disable bits and cache segment selection bits in page table entries of all page frames used by the relatively low priority process to point to a same cache segment.

10. The method of claim 1, wherein a virtual machine monitor (VMM) executing in the data processing system restricts a logical partition (LPAR) or virtual machine executing in the data processing system to a particular cache segment or set of cache segments, by setting cache segment enable/disable bits and cache segment selection bits in page table entries of all page frames used by the LPAR or virtual machine to point to a same cache segment.

11. A computer program product comprising a non-transitory computer readable storage medium having a computer readable program stored therein, wherein the computer readable program, when executed on a computing device comprising a processor and a cache subsystem comprising a cache memory, causes the computing device to;
    segment the cache memory of the cache subsystem such that the cache memory comprises a plurality of cache segments, wherein each cache segment in the plurality of cache segments is associated with a different data property of data stored in the cache segment;
    configure software executing on the processor to direct cache accesses to one of the cache segments based on a corresponding data property of the cache accesses by the software; and
    process, by the processor, a data access operation from the software executing on the processor, based on an identifier of a cache segment in one of an effective address provided by the software or a page table entry corresponding to the effective address provided by the software, wherein the identifier comprises a cache segmentation enablement bit that indicates cache segmenting is used with a page frame corresponding to the page table entry and one or more cache segment selection bits that each indicate a cache segment to be used for caching the cache lines from the page frame corresponding to the page table entry.

12. The computer program product of claim 11, wherein the identifier of the cache segment is in the page table entry in a hardware page table.

13. The computer program product of claim 12, wherein the one or more cache segment selection bits identify a specific cache segment in which data, corresponding to a page frame of a page corresponding to the page table entry, is stored.

14. The computer program product of claim 11, wherein the identifier of the cache segment is a cache segment selection bit of the one or more cache section selection bits in the effective address.

15. The computer program product of claim 14, wherein segmenting the cache comprises mapping a first range of effective addresses to a first cache segment and associating a first cache segment selection bit setting in effective addresses with the first cache segment, and mapping a second range of effective addresses to a second cache segment and associating a second cache segment selection bit setting in effective address with the second cache segment.

16. The computer program product of claim 11, wherein the software executing on the processor controls, via operating system calls, mapping of data utilized by the software to a particular cache segment or set of cache segments at a page level via a page table entry cache segment enable/disable bit and at least one page table entry cache segment selection bit in the page table entry in a hardware page table.

17. The computer program product of claim 11, wherein data property of the data comprises a data longevity property that specifies whether corresponding data is to be placed in a long term data cache segment or a short term data cache segment of the cache, and wherein the identifier of a cache segment identifies one of the long term data cache segment or the short term data cache segment of the cache.

18. The computer program product of claim 11, wherein an operating system executing in the data processing system restricts a relatively low priority process of the software executing on the processor to a particular cache segment or set of cache segments by setting cache segment enable/disable bits and cache segment selection bits in page table entries of all page frames used by the relatively low priority process to point to a same cache segment.

19. The computer program product of claim 11, wherein a virtual machine monitor (VMM) executing in the data processing system restricts a logical partition (LPAR) or virtual machine executing in the data processing system to a particular cache segment or set of cache segments, by setting cache segment enable/disable bits and cache segment selection bits in page table entries of all page frames used by the LPAR or virtual machine to point to a same cache segment.

20. An apparatus comprising:
    a processor; and
    a memory coupled to the processor, wherein the memory comprises instructions which, when executed by the processor, cause the processor to:
    segment a cache memory of a cache subsystem of the apparatus, such that the cache memory comprises a plurality of cache segments, wherein each cache segment in the plurality of cache segments is associated with a different data property of data stored in the cache segment;
    configure software executing on the processor to direct cache accesses to one of the cache segments based on a corresponding data property of the cache accesses by the software; and
    process, by the processor, a data access operation from the software executing on the processor, based on an identifier of a cache segment in one of an effective address provided by the software or a page table entry corresponding to the effective address provided by the software, wherein the identifier comprises a cache segmentation enablement bit that indicates cache segmenting is used with a page frame corresponding to the page table entry and one or more cache segment selection bits that each indicate a cache segment to be used for caching the cache lines from the page frame corresponding to the page table entry.

* * * * *